United States Patent [19]

Toth et al.

[11] 4,376,942

[45] Mar. 15, 1983

[54] THERMAL PRINTING SYSTEM

[75] Inventors: John E. Toth; Wayne M. Spani; Chandler R. Deming; Anthony W. Cumo, all of San Diego, Calif.

[73] Assignee: Cubic Western Data, San Diego, Calif.

[21] Appl. No.: 211,025

[22] Filed: Dec. 1, 1980

[51] Int. Cl.[3] .......... G01D 15/10

[52] U.S. Cl. .......... 346/76 PH; 400/120; 219/216

[58] Field of Search .......... 346/76 PH; 219/216; 400/120

[56] References Cited

U.S. PATENT DOCUMENTS

| | | | |
|---|---|---|---|
| 3,934,695 | 1/1976 | Kovalick | 346/76 R |
| 4,039,065 | 8/1977 | Seki et al. | 346/76 PH X |
| 4,219,824 | 8/1980 | Asai | 346/76 PH |

*Primary Examiner*—Stafford D. Schreyer
*Attorney, Agent, or Firm*—Brown & Martin

[57] ABSTRACT

A thermal printing system in which printing speed is maximized by electronically controlling the temperature of the print elements in accordance with the varying dot pattern being printed. The system includes a thermal printer module and a printer circuit which are specially adapted to be utilized in a modularized device such as a ticket vending machine. The printer circuit includes a microprocessor which demodulates serial data commands and stores the demodulated data in an input buffer. The microprocessor decodes the information in the input buffer and sets up an output buffer containing character data to be printed on the ticket. The microprocessor causes the character data stored in the output buffer to be printed on the ticket using software timing loops to selectively control the temperature of the individual print elements. The alphanumeric information is printed in dot matrix form on the ticket, in column by column fashion, each column consisting of a plurality of dots representative of portions of characters in separate lines. Each print element has associated therewith solid state preheat and print drivers which sequentially cause a preheat current, a print current and then zero current to flow through the print element when it prints a dot to maximize the speed at which the print element temperature passes the thermal coating threshold temperature.

7 Claims, 13 Drawing Figures

THERMAL PRINTING SYSTEM

BACKGROUND OF THE INVENTION

The present invention relates to thermal printing systems, and more particularly, to a thermal printing system in which printing speed is maximized by electronically controlling the temperature of the print elements in accordance with the varying dot pattern being printed.

Thermal printers are widely used in devices such as electronic adding machines, cash registers, and home computer systems. Typically they print alphanumeric information in dot matrix form on paper coated with a thermally sensitive material. The print head elements comprise thick film deposited resistors through which current is passed in pulses to heat the thermally sensitive material to a temperature at which it changes color, thereby causing dots to be printed on the paper.

The speed of printing in a thermal printer is limited by the speed at which the individual print elements in the print head can be heated to a temperature above the thermal coating threshold temperature and then cooled to below the thermal coating threshold temperature during the printing of each dot. In some environments, such as a ticket vending machine for a mass transit system, it would be desirable to provide a thermal printing system capable of rapidly printing information on tickets over a long period of time with high reliability and low power consumption.

SUMMARY OF THE INVENTION

It is therefore the primary object of the present invention to provide an improved thermal printing system in which printing speed is maximized by electronically controlling the temperature of the print elements in accordance with the varying dot pattern being printed.

Another object of the present invention is to provide a thermal printing system of the aforementioned type which includes a novel printer module for mechanically conveying the stock to be printed on past the thermal printing head.

Yet another object of the present invention is to provide a thermal printing system of the aforementioned type which has minimum standby power consumption.

Still another object of the present invention is to provide a thermal printing system of the afore-mentioned type in which each of the print elements is automatically checked at the conclusion of each printing operation to determine if any of the print elements is defective.

Still another object of the present invention is to provide a thermal printing system of the aforementioned type in which each print element is sequentially driven with a preheat current, a print current, and then zero current in printing each dot, so that the rate at which the print element temperature passes the thermal coating threshold temperature is maximized.

The thermal printing system of the present invention comprises a thermal printer module and a printer circuit. The printer module is specially designed so that it can be utilized in a modularized system including compatible feeder/cutter, static diverter, and transport modules, all supported by a common vertical support plate. The printer module includes a plurality of drive rollers and pressure rollers for propelling a ticket through a channel, beneath and in contact with a print head. The print head is pivotally mounted and resiliently biased toward a drive roller immediately beneath it so that the ticket will be squeezed between the drive roller and the print head as the ticket is propelled through the module. A height adjusting mechanism limits the downward movement of the print head toward the adjacent drive roller to prevent contact therebetween when a ticket is not present.

The module is adapted to be rapidly mounted on and detached from the common support plate for the various modules utilizing captive screws. The opposite ends of the drive rollers are journalled in ball bearings mounted in opposite side plates of the modules. The drive rollers are surrounded with sleeves or cushions made of an elastomeric material that yields when a ticket is propelled through the ticket channel formed in adjacent upper and lower ticket guide plates of the module. The guide plates have apertures therein which permit the resilient cushions and sleeves of the drive rollers to project therethrough for propelling the ticket. There is also an aperture in the upper ticket guide plate in which the print head is hingedly mounted. The underside of the print head has a plurality of print elements arranged in a row which traverses the path of travel of the ticket. The print elements comprise thick film deposited resistors through which current is passed in pulses to heat the coating of thermally sensitive material on the ticket to the threshold temperature at which it changes color, thereby causing dots to be printed on the ticket.

The printer circuit is specially adapted for maximizing printing speed by controlling the temperature of the print elements in accordance with the varying dot pattern being printed. Thus, the ticket may be rapidly propelled through the thermal printer module, for example at the speed of three inches per second, while multiple lines of alphanumeric information are printed on the ticket. The information is printed in dot matrix form, in column by column fashion. In other words, each character consists of several vertical columns of dots. In order to simultaneously print a plurality of lines of alphanumeric information, the first character of each line is simultaneously printed, then the second character of each line and so forth. By way of example, the first column of dots which is printed may consist of six vertical dots for the letter A in the first line, one dot for the letter T in the second line, two dots for the letter X in the third line, etc.

In order to print rapidly, the printer circuit maximizes the rate at which the temperature of each individual print element passes the thermal coating threshold temperature. The time required to heat the individual elements to a temperature above the thermal coating threshold temperature and the time required to cool each individual print element to a temperature below the thermal coating threshold temperature are both minimized. Heating time is minimized by preheating each print element to a temperature just below the thermal coating threshold temperature. Cooling time is minimized by removing the preheat after each dot is printed.

The printer circuit includes a printer microprocessor which receives serial data commands from a control microprocessor which commands represent the format and text of the alphanumeric information which is to be printed. The printer microprocessor demodulates the serial data commands and stores the demodulated data in an input buffer. The microprocessor also decodes the data stored in the input buffer and sets up an output buffer containing character data to be printed on the ticket. The microprocessor causes the character data contained in the output buffer to be printed on the ticket, using software timing loops to selectively control the temperature of each of the individual print elements.

Each individual print element has associated therewith solid state preheat and print drivers. These drivers are turned on and off so that sequentially a preheat current, a print current, and then zero current flows through the corresponding print element. The amplitudes of preheat and print currents are selected so that the preheat current heats the print element to a temperature slightly below the thermal coating threshold temperature and the print current heats the print element to a temperature above the thermal coating threshold temperature.

Once all of the serial data has been received by the printer microprocessor, it causes the preheat current to flow through each of the elements. After all of the data for printing a column of dots comprising portions of characters in each of the plurality of lines of information to be printed has been stored in a plurality of latches, the control microprocessor causes a multiplexer to send a strobe signal to each of the latches. The leading edge of the strobe signal causes the preheat current for each element which is to print a dot to be turned off and to have the print current flow through the same element. The preheat current continues to flow through the other print elements which are not to print dots for this column. Midway through the duration of the strobe signal, the print current is turned off for each of the print element that printed dots. Thereafter, a further time interval passes during which zero current is supplied to the elements that just printed dots. This permits them to rapidly cool to a temperature below the thermal coating threshold temperature. The trailing edge of the strobe signal causes the preheat current to once again flow through the print elements which just printed dots so that once again all of the print elements have a preheat current flowing therethrough. This cycle repeats itself for each vertical column of dots which is printed.

Upon the conclusion of the printing of all of the alphanumeric information on the ticket, the printer circuit automatically performs a diagnostic routine to make sure that none of the print elements is defective. This routine entails sequentially passing current through each of the elements of the print head and utilizing a comparator to sense the voltage developed across a current sensing resistor.

The printer circuit further includes a timing mechanism which monitors the strobe signals. Upon the expiration of a predetermined time interval after the last strobe signal, the timer automatically turns off the preheat current to each of the print elements. Thus, the circuit has minimum standby power consumption until the next printing operation is to be performed.

DESCRIPTION OF THE PREFERRED EMBODIMENT

Figure 1:
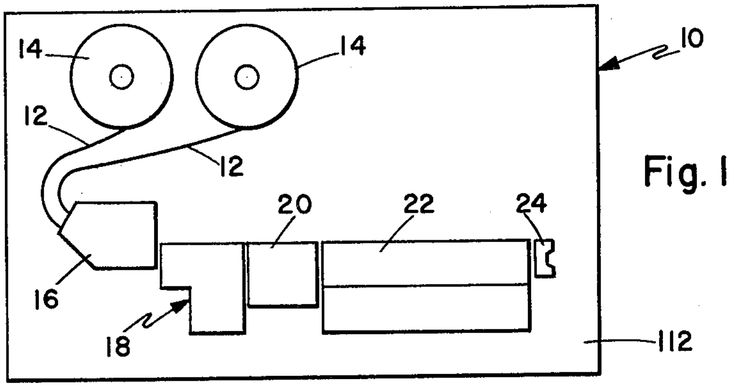
FIG. 1 is a simplified view of a ticket vending machine in which the thermal printing system of the present invention may be utilized.

Referring to FIG. 1, there is illustrated therein in simplified form an automatic ticket vending machine 10 in which the thermal printing system of the present invention may be utilized. Mass transit systems now use tickets that are coded for fare collection for a number of trips. Thus, multiple fare payments for rides on trains, subways, busses or the like may be handled by the purchase of one ticket from a device such as the vending machine 10 illustrated in FIG. 1. This avoids the necessity of individual money and coin transactions with each ride, reduces robbery problems, and eases time delays for such transactions in moving passengers onto and off of the conveyances.

While the vending machine 10 (FIG. 1) does not form part of the present invention, its operation will be briefly described to convey an understanding of the type of environment in which the thermal printing system of the present invention may be utilized to great advantage. In this vending machine, ticket stock 12 is advanced from one of the pair of ticket stock rolls 14 into a feeder/cutter module 16 where a shear cuts off a ticket from the stock. This ticket is advanced to the right through a thermal printer module 18 which receives signals from a printer circuit later described so that alphanumeric information can be printed onto the coating of thermally sensitive material on the ticket. The thermal printer module 18 and the printer circuit hereinafter described comprise the thermal printing system of the present invention. The ticket next passes to the right through a static diverter module 20 into a high speed ticket transport module 22. The ticket has a strip of magnetic material thereon so that binary information representative of individual fare determination and collection can be encoded onto and read from the ticket. As the ticket passes through the magnetic transport module 22, information representative of cumulative fares paid for by the patron operating the vending machine 10 is magnetically encoded onto the ticket. If the information magnetically encoded onto the ticket passes a verification step, the ticket is dispensed to the right through an exit bezel 24 to the patron. If the information magnetically encoded onto the ticket fails the verification step, the ticket is driven to the left, back into the static diverter module 20 from which it exits downwardly into a bin containing defective tickets.

As the ticket passes through the thermal printer module 18 (FIG. 1) alphanumeric information is printed thereon in dot matrix form in column-by-column fashion to provide the patron with visual indication of the type of ticket, the route, the expiration date, the frequency of passage, total value, etc. For example, the ticket may have thermally printed thereon the following information on consecutive lines:

"Victoria to Paddington"; Via Oxford Circcus";
"Privilege Child"; "Weekly until 15 July 1980";
"F20.75"; etc.

In order for the vending machine 10 (FIG. 1) to be capable of rapidly dispensing tickets to successive patrons, the alphanumeric information must be thermally printed on the ticket at very high speed. In the preferred embodiment of the system, the ticket passes through the printer module at a speed of three inches per second. Since the vending machine 10 operates over a long period of time, it is desirable that the thermal printing system incorporated therein consume a minimum amount of power in its standby mode. In addition, the thermal printing system in the vending machine 10 must have a high reliability since down time of the machine can result in passenger jams at the station. Therefore, it is desirable to have a self-diagnostic feature incorporated into the thermal printing system in the vending machine so that defects in the thermal printing system can be rapidly determined and brought to the attention of appropriate maintenance personnel. As explained more fully hereafter, these capabilities are achieved by the thermal printing system of the present invention. The mechanical structure of the thermal printer module 18 (FIG. 1) will be described first, and thereafter the printer circuit and its operation will be described.

1. The Thermal Printer Module

Figure 2:
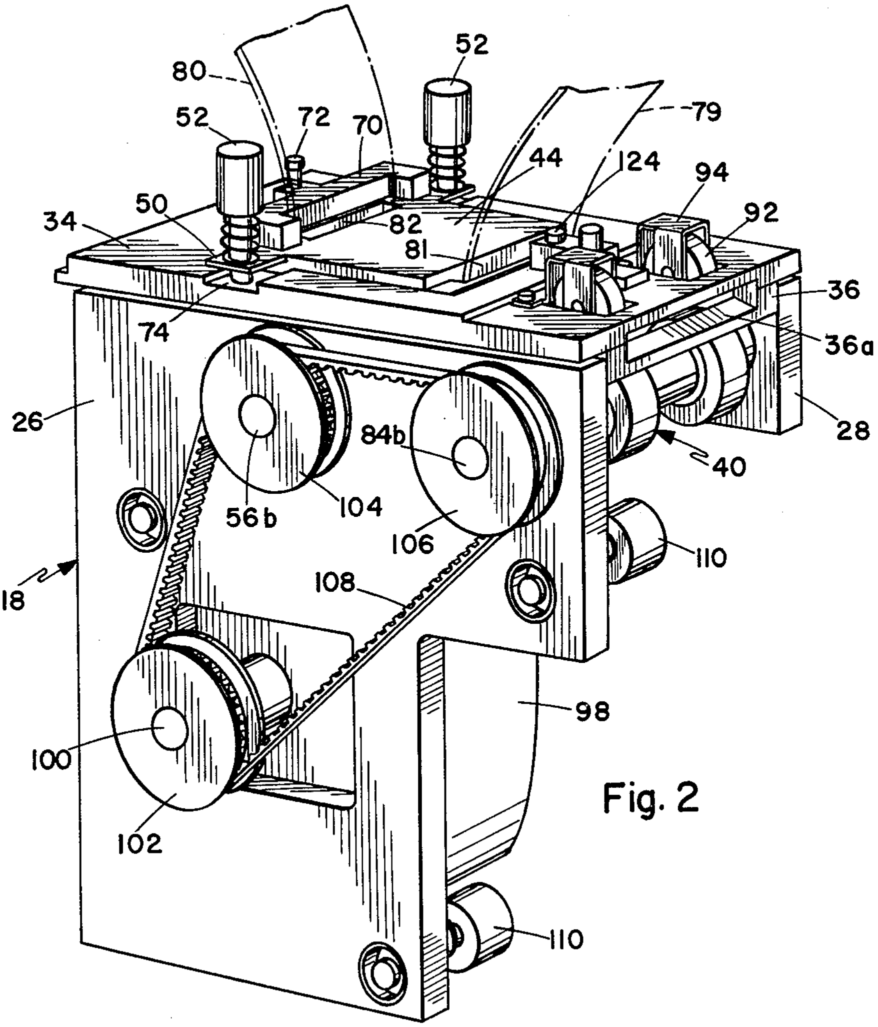
FIG. 2 is a perspective view of the thermal printer module which forms a part of the thermal printing system of the present invention.

Referring to FIG. 2, the thermal printer module 18 includes a pair of vertical side plates 26 and 28 which are held in spaced apart parallel relationship by a pair of connecting bars 30 and 32 (FIG. 4) to form a housing for the operative components of the printer module. A pair of upper and lower horizontal ticket guide plates 34 and 36 are clamped together and mounted to the upper edges of the side plates 26 and 28 (FIG. 2). The lower guide plate 36 has a longitudinally extending channel 38 (FIG. 5) formed therein which forms a track through which the ticket is propelled during the printing operation.

The preferred embodiment of the printer module is adapted for accepting credit card size tickets. Ticket thickness may vary from 0.007 inches to 0.020 inches. Ticket may be made of paper or plastic coated with a suitable thermally sensitive material. The tickets may also have a strip or facing of magnetic material on one side to enable the magnetic encoding of information thereon.

Figure 3:
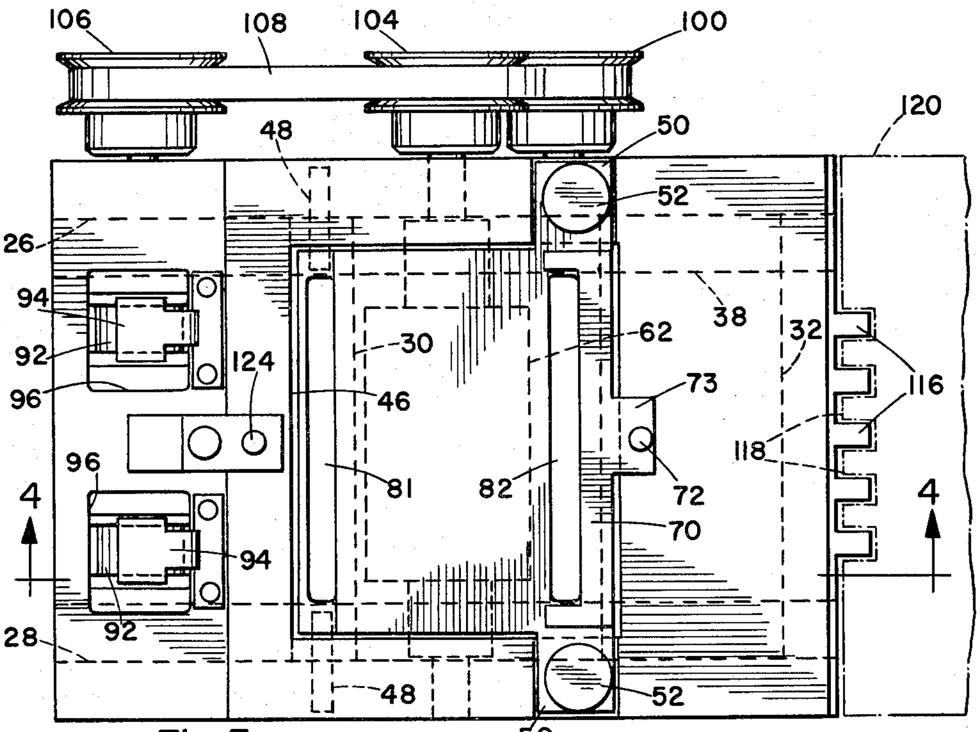
FIG. 3 is a top plan view of the thermal printer module.
Figure 4:
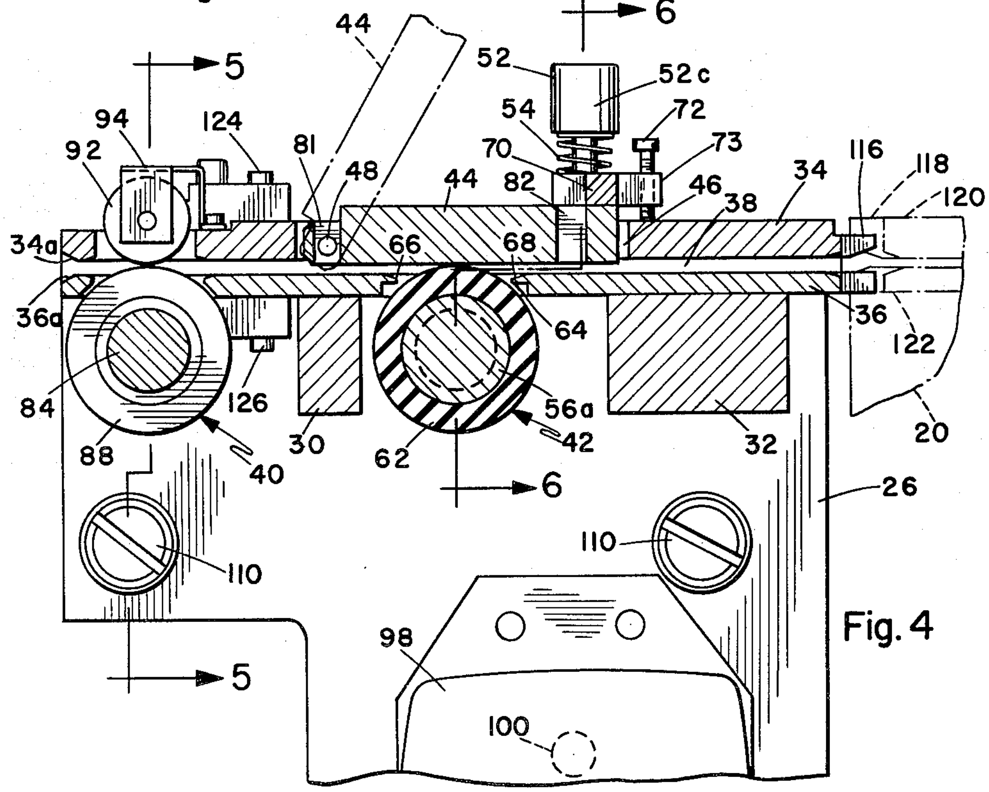
FIG. 4 is a sectional view of the thermal printer module taken along line 4—4 of FIG. 3.

The ticket is propelled through the thermal printer module 18 by a ticket drive roller 40 (FIG. 5) at the entrance of the module and by a ticket drive roller 42 positioned midway of the length of the module. The ticket drive roller 42 is positioned directly beneath a hingedly mounted print head 44. As best seen in FIGS. 3 and 4, the upper ticket guide plate 34 has a large rectangular aperture 46 in its medial portion. The rectangular shaped print head 44 is mounted within the aperture 46 of the upper guide plate 34, utilizing a pair of pivot pins 48 (FIGS. 3 and 4). The print head is normally maintained in its horizontal position shown in FIG. 2 so that a ticket that is propelled through the channel or track 38 (FIG. 4) will be squeezed between the drive roller 42 and the underside of the print head 44. In this mode, the underside of the print head 44 is in direct contact with the coating of thermally sensitive material on the upper side of the ticket. As the ticket moves to the right in FIG. 4, beneath the print head, the individual print elements on the print head are selectively heated and cooled so that alphanumerical information is printed on the ticket in dot matrix format.

Figure 6:
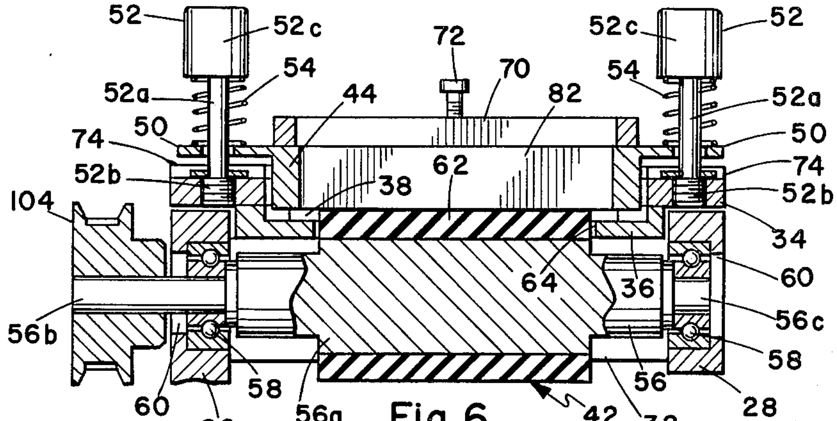
FIG. 6 is a partial sectional view of the thermal printer module taken along line 6—6 of FIG. 4.

The print head 44 may be raised to the position shown in phantom lines in FIG. 4 to facilitate adjustments in alignment and periodic cleaning. The end of the print head opposite from the pivot pins 48 has a pair of support flanges 50 which extend from opposite sides of print head as shown in FIGS. 2, 3 and 6. Adjustable means for resistently biasing the print head downwardly are provided. Specifically, a pair of captive screws 52 (FIG. 6) have shanks **52*a*, which extend through holes in respective ones of the support flanges 50 on either side of the print head 44. The threaded portions 52*b* of the captive screws are screwed into threaded holes in either side of the upper ticket guide plate 34. The diameter of the holes in the support flanges 50 is slightly larger than the diameter of the shanks 52*a* of the captive screws so that the support flanges can freely slide between the upper guide plate 34 and the heads 52*c* of the captive screws. Springs 54 surround the shanks 52*a* of the captive screws and are positioned between the heads 52*c* of the screws and the upper side of the support flanges 50. The springs normally bias the print head downwardly closely adjacent to the drive roller 42. When a ticket is propelled between the drive roller 42 and the print head 44, the print head 44 can pivot slightly upward by compressing the springs 54 somewhat to provide enough clearance to allow the ticket to pass through. Thus if a credit card or some other foreign object is forced through the channel 38**, the print head can pivot away to reduce the likelihood of damage thereto. Also if a conventional ticket should become crumpled or misaligned in the channel, the print head can likewise swing away.

As best seen in FIG. 6, the drive roller 42 which is positioned immediately beneath the print head 44 may comprise a metal shaft 56 having a larger diameter medial portion **56*a* and a pair of stub portions 56*b* and 56*c*. The stub portions of the shaft are journaled in ball bearings 58 secured in aligned holes 60 in corresponding ones of the side plates 26 and 28. Surrounding the medial portion 56*a* of the shaft 56 is a sleeve 62 made of a suitable elastomeric material. This sleeve yields as a ticket is propelled between the drive roller 42 and the print head 44. The uppermost portion of the elastomeric sleeve 62 of the drive roller 42 extends through a rectangular aperture 64 (FIGS. 4 and 6) in the intermediate portion of the lower ticket guide plate 36. The rearward and forward edges 66 and 68 of the aperture 64 in the lower ticket guide plate are beveled downwardly toward the drive roller 42** to ensure smooth passage of the ticket past the aperture.

A U-shaped yoke 70 (FIGS. 2, 3 and 4) is secured to the upper side of the forward end of the print head 44. A screw 72 is threadedly engaged in a hole extending vertically through a tongue 73 extending forwardly from the middle of the yoke 70. The lower end of the screw 72 buts against the upper side of the upper ticket guide plate 34 as shown in FIG. 4, just forward of the aperture 46 containing the print head 44. The screw 72 may be turned to adjust the height of the print head relative to the drive roller 42. Preferably the print head is prevented from contacting the drive roller 42 by proper adjustment of the screw 72. A pair of rectangular-shaped recesses 74 (FIGS. 2 and 6) are formed in either side of the upper ticket guide plate 34 for receiving the support flanges 50 to permit the print head 44 to be lowered to a fully horizontal position, if necessary.

One suitable print head is Model Number 01127-5G1, 80021D manufactured by Gulton Industries located in New Jersey, in the United States of America. The construction of this type of thermal print head is illustrated in simplified form in FIGS. 7 and 8. The print head 44 includes an upper heat sink portion 75 (FIG. 8) made of metal. A ceramic substrate (not visible in the drawings) is affixed to the underside of the heat sink portion 75. A plurality of conductors 76 (shown as phantom lines in FIGS. 7 and 8) are formed on the underside of the ceramic substrate by depositing a layer of copper and etching the same. An elongated bar 77 of a material having suitable electrical resistance is deposited on the underside of the ceramic substrate. The conductors 76 divide the bar 77 into a plurality of individual print elements 78. Current may be passed through individual ones of the print elements 78 via the conductors 76 to cause dots to be printed onto the thermally sensitive material on top of the ticket at given locations directly beneath the particular print elements.

Figure 7:
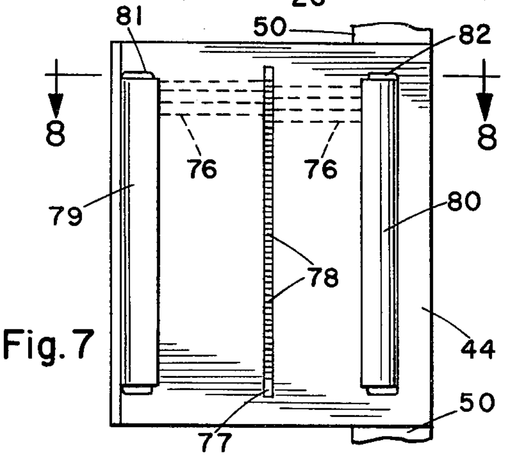
FIG. 7 is a simplified view of the underside of the thermal print head of the thermal printer module.
Figure 8:
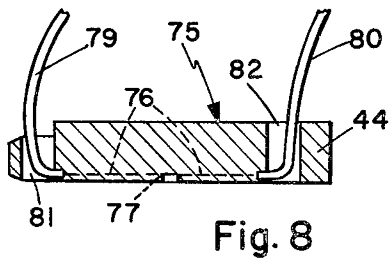
FIG. 8 is a sectional view of the thermal print head taken along line 8—8 of FIG. 7.

It will be understood that for simplicity, in FIG. 7 only a few of the conductors 76 have been schematically represented and the manner in which they are interconnected to the bar 77 of resistive material has not been illustrated in detail. Current is supplied to selected ones of the conductors 76 through a plurality of individual wires connected thereto, the wires being grouped in large flat buses 79 and 80 (FIGS. 2 and 8). The buses 79 and 80 are connected to the conductors 76 on the underside of the print head 44 through respective elongated apertures 81 and 82 (FIGS. 3 and 8) formed adjacent the rearward and forward edges of the print head. The other ends of the buses 79 and 80 are connected to the printer circuit described hereafter which electronically controls the temperature of the individual print elements in accordance with the varying dot pattern being printed. The individual print elements 78 (FIG. 7) extend in a linear array across the path of travel of the ticket and thus alphanumeric information is printed on the ticket in column by column fashion as will be explained in greater detail hereafter.

The rearward edges of the upper and lower ticket guide plates 34 and 36 are beveled at 34*a* and 36*a*, respectively as shown in FIG. 4 to guide the ticket from the feeder/cutter module 16 (FIG. 1) into the printer module 18. The rear ticket drive roller 40 (FIG. 5) includes a central metal shaft 84 which is formed with a pair of spaced apart larger diameter portions 84*a* and a pair of stub portions 84*b* and 84*c* at opposite ends thereof. The stub portions 84*b* and 84*c* are journaled in ball bearings 86 mounted in corresponding holes 87 formed in the side plates 26 and 28. Annular cushions 88 made of a suitable elastomeric material surround each of the portions 84*a* of the shaft of the drive roller 40. The upper portions of each of the cushions 88 extend through corresponding slots 90 (FIGS. 4 and 5) formed in the rearward portion of the lower ticket guide plate 36. Thus as the ticket enters the track or channel 38 of the printer module 18 from the feeder/cutter module 16, it engages the annular cushions 88 of the rearward drive roller 40 which propel the ticket forwardly, to the right in FIG. 4.

Figure 5:
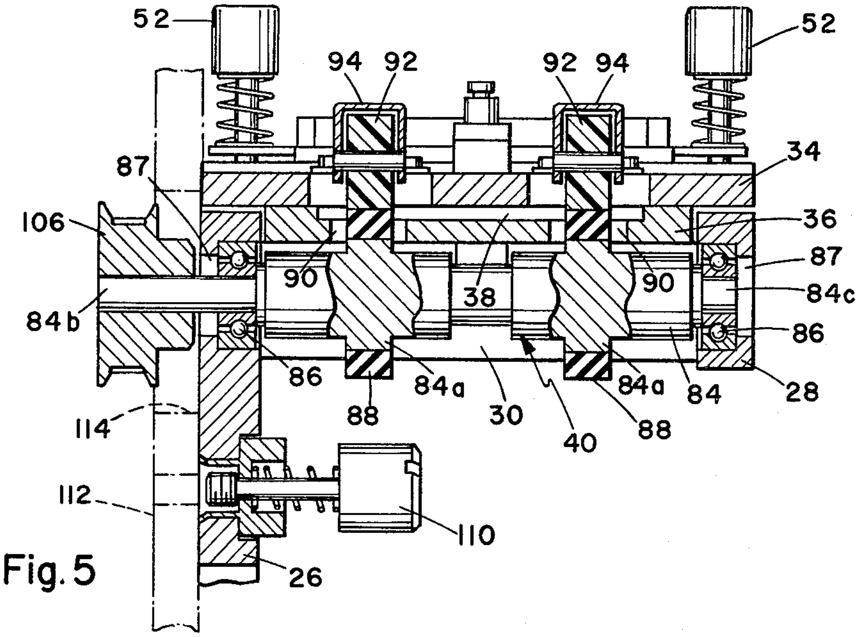
FIG. 5 is a sectional view of the thermal printer module taken along line 5—5 of FIG. 4.

A pair of pressure rollers 92 (FIGS. 2, 3 and 4) are each rotatably mounted to corresponding support bracket and leaf spring assemblies 94 which are secured to the rearward portion of the upper ticket guide plate 34 as best seen in FIG. 4. The rearward portion of the upper ticket guide plate 34 has a pair of spaced apart apertures 96 (FIG. 3) formed therein through which the lowermost portions of the pressure rollers 92 extend as shown in FIG. 4. The support bracket and leaf spring assemblies 94 resiliently bias the pressure rollers downwardly against corresponding ones of the annular cushions 88 of the rearward drive roller 40 as shown in FIG. 5. Thus when a ticket passes from the feeder/cutter module 16 (FIG. 1) into the printer module 18, the ticket is squeezed between the rear drive roller 40 and the pressure rollers 92, the drive roller 40 propelling the ticket forwardly to the right in FIG. 4.

A reversible AC motor 98 (FIGS. 2 and 4) is mounted to the lowermost portion of the side plate 26. The shaft 100 of the motor 98 has a toothed drive pulled 102 rigidly mounted thereon. Similarly, as shown in FIGS. 2, 5 and 6, the stub portions 56*b* and 84*b* of the drive rollers 42 and 40 have toothed drive pulleys 104 and 106 rigidly mounted thereon. A toothed timing belt 108 (FIG. 2) is entrained about the drive pulleys 102, 104 and 106 so that the motor 98 can simultaneously drive both of the ticket drive rollers 40 and 42 in the same direction. It will be noted that the outer diameter of the sleeve 62 (FIG. 6) of the drive roller 42 and the outer diameter of the annular cushions 88 (FIG. 5) of the drive roller 40 are equal and the drive pulleys 104 and 106 are identical. Thus a ticket entering the thermal printer module will be driven at the same speed, either forwardly or rearwardly, by both the drive rollers 40 and 42. In the preferred embodiment of the system, the ticket is moved under the print head at a speed of three inches per second. If desired, a one-way, Sprague-type clutch may be operatively coupled between the drive pulley 104 and the forward ticket drive roller 42 so that the ticket drive roller beneath the print head can only be driven to move a ticket forwardly past the print head.

The side plate 26 is provided with three captive retaining screw mechanisms 110 (FIGS. 2 and 5) which permit the printer module 18 to be readily mounted to, and readily detached from, a large common support plate 112 (FIGS. 1 and 5) which supports the various modules of the vending machine 10. The common support plate has an aperture 114 (FIG. 5) through which the drive pulleys of the printer module extend so that the timing belt is free to travel about the same.

The forward edges of the upper and lower ticket guide plates 34 and 36 are each provided with a plurality of fingers 116 (FIG. 3) which mate with a plurality of similar fingers 118 formed in the rearward edges of the corresponding upper and lower guide plates 120 and 122 (FIGS. 3 and 4) of the adjacent static diverter module 20. The surfaces of the fingers 116 which face the channel 38 diverge away from the channel. The surfaces of the fingers 118 of the module 20 are similarly formed. This interlocking finger arrangement on the exit of the printer module permit mating with the adjoining static diverter module so that the ticket will be able to travel either direction at the interface between the two without any obstruction or jamming.

A photodiode 124 (FIGS. 2, 3 and 5) is mounted to the upper guide plate 34 and projects its light downwardly through an aperture in the guide plate, through the channel 38, and into an aperture (not shown) in the lower guide plate 36. A photosensor 126 (FIG. 4) is mounted to the underside of the lower ticket guide plate 36 for receiving the light projected into the aperture in the guide plate 36 from the photodiode 124. The photodiode and the photosensor are electrically connected to a microprocessor to enable it to detect the presence of a ticket. This microprocessor in turn send signals to the printer circuit hereafter described upon detecting the leading edge of a ticket in order to commence the printing operation shortly thereafter.

2. The Printer Circuit

The speed of printing in a thermal printer of the dot matrix type is limited by how fast the individual print elements in the print head can be heated to a temperature above the thermal coating threshold temperature and then cooled to below the thermal coating threshold temperature while printing each dot. The printer circuit of FIG. 9 which forms a part of the thermal printing system of the present invention enables the printing speed to be greatly increased by electronically controlling the temperature of the print elements in accordance with the varying dot pattern being printed on the ticket. Each print element comprises a thick film deposited resistor which is heated by passing an electric current through the element. The heat at which the thermally sensitive coating on the ticket media (paper or plastic) starts changing color is referred to herein as the threshold temperature ($T_t$). In order to print rapidly, the rate of change of temperature as it passes the threshold temperature during both heating and cooling must be maximized. The heating time ($T_h$) required is directly proportional to the temperature differential and inversely proportional to the applied power. This relationship is set forth in Equation I. below:

$$T_h = K_1(T_t - T_a)/I^2R \quad \text{Equation I.}$$

where:

$T_t$ = thermal coating threshold temperature $T_a$ = starting (preheat) temperature $T_h$ = time required to change temperature from $T_a$ to $T_t$ $K_1$ = proportionality constant I = current R = resistance of print head The cooling time ($T_c$) is inversely proportional to the difference between the thermal coating threshold temperature and the heat sink temperature ($T_b$). This relationship is set for in Equation II set forth hereafter:

$$T_c = K_2/(T_t - T_b) \quad \text{Equation II.}$$

where:

$T_c$ = cooling time required to change temperature from $T_t$ to $T_a$ $T_t$ = thermal coating threshold temperature $T_b$ = heat sink temperature $K_2$ = proportionality constant Therefore to minimize the heating time ($T_h$) the term ($T_t - T_a$) in Equation I must be made small by preheating the individual print elements so that $T_a$ is only slightly lower than $T_t$. To minimize the cooling time, the term ($T_t - T_b$) in Equation II must be made large by eliminating the previously mentioned preheating. The printer circuit of FIG. 9 accomplishes both of the aforementioned objectives by selectively applying a preheat current to each individual print element in the print head on a dot by dot basis in accordance with the information being printed.

Figure 9:
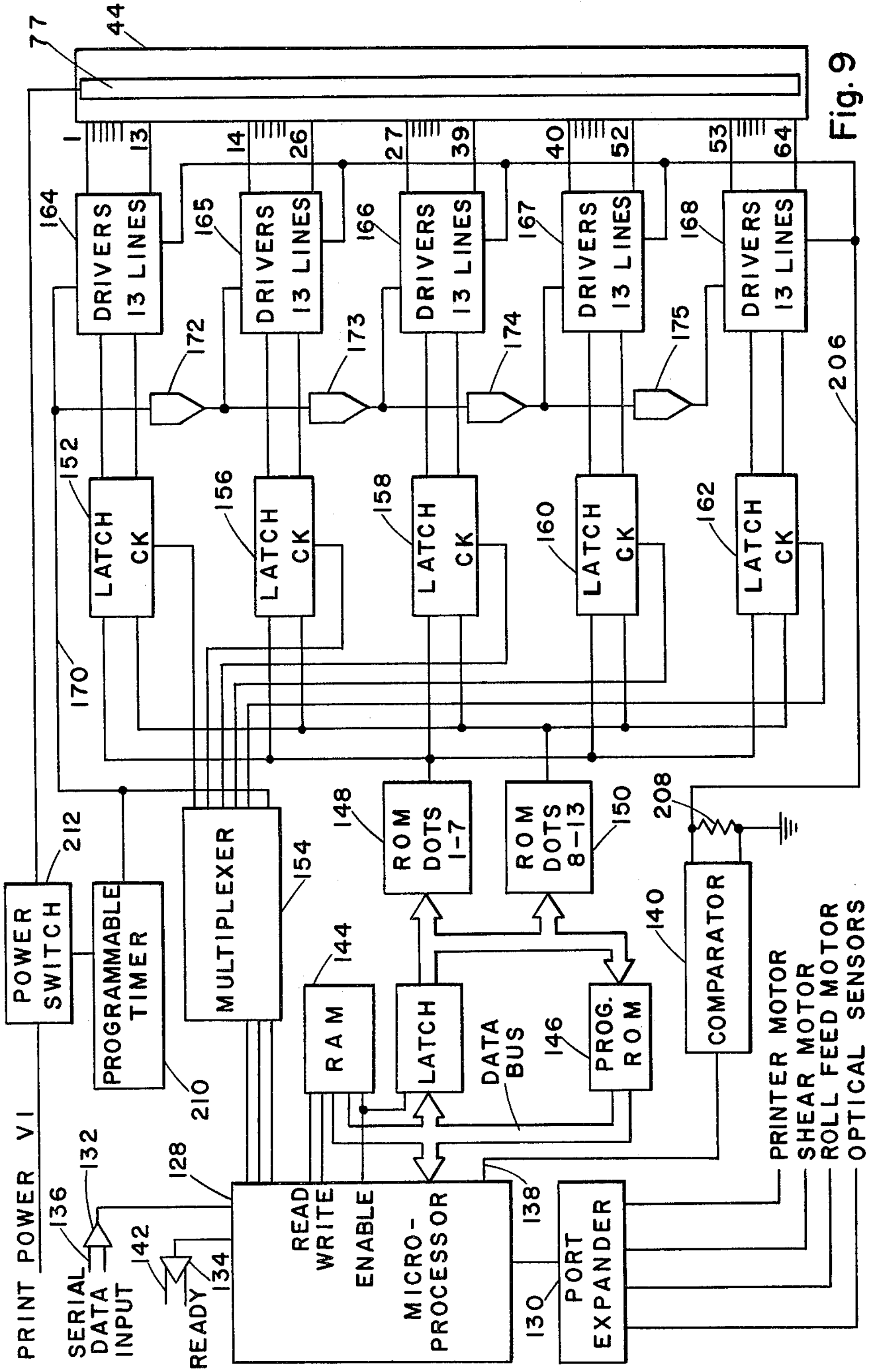
FIG. 9 is a functional block diagram of the printer circuit which forms a part of the thermal printing system of the present invention.

Referring to FIG. 9, the printer circuit includes a printer microprocessor 128, such as an INTEL 8039, to control the application of power to selected ones of 64 different print elements in the print head 44. The thermal printing system of the present invention prints columnwise across the ticket. In the preferred embodiment of the system, five lines of alphanumeric information are printed on the ticket at a time, for 50 characters per line. Characters may be printed in three different forms, namely in a 7 by 5 matrix, a 9 by 5 matrix, and a 9 by 9 matrix. Underlining can be printed on lines 2, 3, or 5 on 7 by 5 characters.

The printer microprocessor 128 gets commands from a control microprocessor (not shown) which coordinates the operation of various modules in the vending machine 10 (FIG. 1). Signals indicating the operational status of the motor which feeds ticket stock from the rolls 14 as well as the motors for the feeder/cutter module 16 and the thermal printer module 18, along with signals from the optical sensors in the thermal printer module 18 are fed through a port expander 130 (FIG. 9) to the printer microprocessor 128. Serial data from the control microprocessor is inputed to the printer microprocessor 128 through its input 132. The printer microprocessor 128 has a ready output 134 which is set to logical HI to tell the control microprocessor that the printer circuit is ready to respond to commands sent over the serial data line 136.

There is a print head diagnostic input 138 to the printer microprocessor 128. As described more fully hereafter, each print element can be checked to verify that it will draw sufficient current to enable it to thermally print a dot onto the ticket. A diagnostic routine is performed after each ticket is printed by sending a preheat current to all of the print elements while enabling print current is sequentially applied to the 64 print elements in place of the preheat current. As each print element is checked, a comparator 140 will output a logical HI to the printer microprocessor input 138 if the element draws enough current to verify that it is not defective. All print elements are individually checked in this manner after each ticket is printed. In the event that any one of the print elements is determined to be defective, the printer microprocessor 148 causes a signal to be sent so that a station attendant will repair the print head.

The printer microprocessor 128 causes each of the print elements to be supplied with a preheat current approximately 300 milliseconds before printing is to commence and thereafter throughout the printing operation. During actual printing, the printer microprocessor causes a print current to be selectively applied to the print elements to cause the various dots to be printed on the moving ticket that will cause the predetermined alphanumeric information to be printed onto the ticket. It will be understood that the amplitude of the preheat and print currents is carefully selected in accordance with Equations I and II above in order to permit rapid printing of the ticket.

An 8 bit code is utilized to send commands to the printer microprocessor over the serial data line 136 which causes the printer microprocessor to execute various functions, as illustrated hereafter:

| CODE (MSB 1 ST) | FUNCTION |
|---|---|
| 11ØØØØØ1 | START LINE |
| 11ØØØØ1Ø | START LINE UNDERLINED |
| 11ØØØ1ØØ | START PREHEAT |
| 11ØØ1ØØØ | CANCEL |
| 11Ø1ØØØØ | START PRINT |
| 111***** | SPACE '*****' TIMES (1-32) |
| ØØ****** | PRINT 7×5 CHAR '******' (1-64) |
| Ø1****** | PRINT 9×5 CHAR '******' (1-64) |
| 1Ø****** | PRINT 9×9 CHAR '******' (1-64) |

(NOTE: '*' ABOVE INDICATES 'Ø' OR '1')

The organization and operation of the printer circuit illustrated in functional block diagram form in FIG. 9 will now be described. By way of summary, the printer microprocessor 128 demodulates serial input data representing commands sent from the control microprocessor. The printer microprocessor stores the demodulated data in an input buffer. The data contained in the input buffer is decoded and character data to be printed on the ticket is stored in an output buffer. Thereafter, the printer microprocessor causes the character data stored in the output buffer to be printed on the ticket, utilizing software timing loops to control the preheat and print current signals to the print elements. After the printing of alphanumeric information on the ticket is completed, the microprocessor institutes the diagnostic routine that verifies that each of the print elements is capable of drawing the requisite current for printing.

The sequence of events that would occur in the printing of the ticket would be as follows. A ticket purchaser operating the vending machine 10 (FIG. 1) causes the control microprocessor to send a START PREHEAT command to the printer microprocessor 128 (FIG. 9) via the serial data line 136. In response to this command, the printer microprocessor causes a preheat current to flow through each of the 64 print elements of the print head 44 and sets ready line 142 HI. The signal on the ready line 142 would be set LO if the print head current diagnostic routine which took place after the last ticket had been printed indicated a defective print element. In such a case the station attendant would be notified and no further tickets would be dispensed until the appropriate repairs were made.

After the purchaser enters the required destination, type of card, duration, etc. information at the vending machine to specify the type of ticket, the control microprocessor sends the corresponding text data to the printer microprocessor 128 over the serial data input line 136. The control microprocessor sends commands to the printer microprocessor for START LINE, START LINE UNDERLINED, SPACE, and character commands, as required. The printer microprocessor 128 demodulates the serial data received from the control microprocessor and stores the demodulated data in an input buffer in the form of a RAM 144.

After each character is received, the printer microprocessor times the interval until the next character is sent over the line 136. If no data is received after a predetermined time interval, for example ten milliseconds, the printer microprocessor assumes that the last character has been transmitted and sets ready line 142 LO. Utilizing software stored in a programmable ROM 146, the printer microprocessor decodes the data stored in the RAM 144 and sets up an upput buffer in the RAM 144 consisting of the character data which is to be printed on the ticket. The printer microprocessor then sets the ready line 142 HIGH.

After the purchaser pays for the ticket at the vending machine 10, the control microprocessor in the vending machine sends commands to operate the motor 98 (FIG. 2) to start the movement of the ticket through the printer module 18. At the same time, the control microprocessor sends a START PRINT command to the printer microprocessor. When the printer microprocessor receives this command, it sets the ready line 142 LO. A signal is sent from the photosensor 126 (FIG. 4) through the port expander 130 (FIG. 9) to the printer microprocessor 128 indicating that the leading edge of the ticket has arrived to a position just rearward of the print head 44 (FIG. 4).

Figure 10:
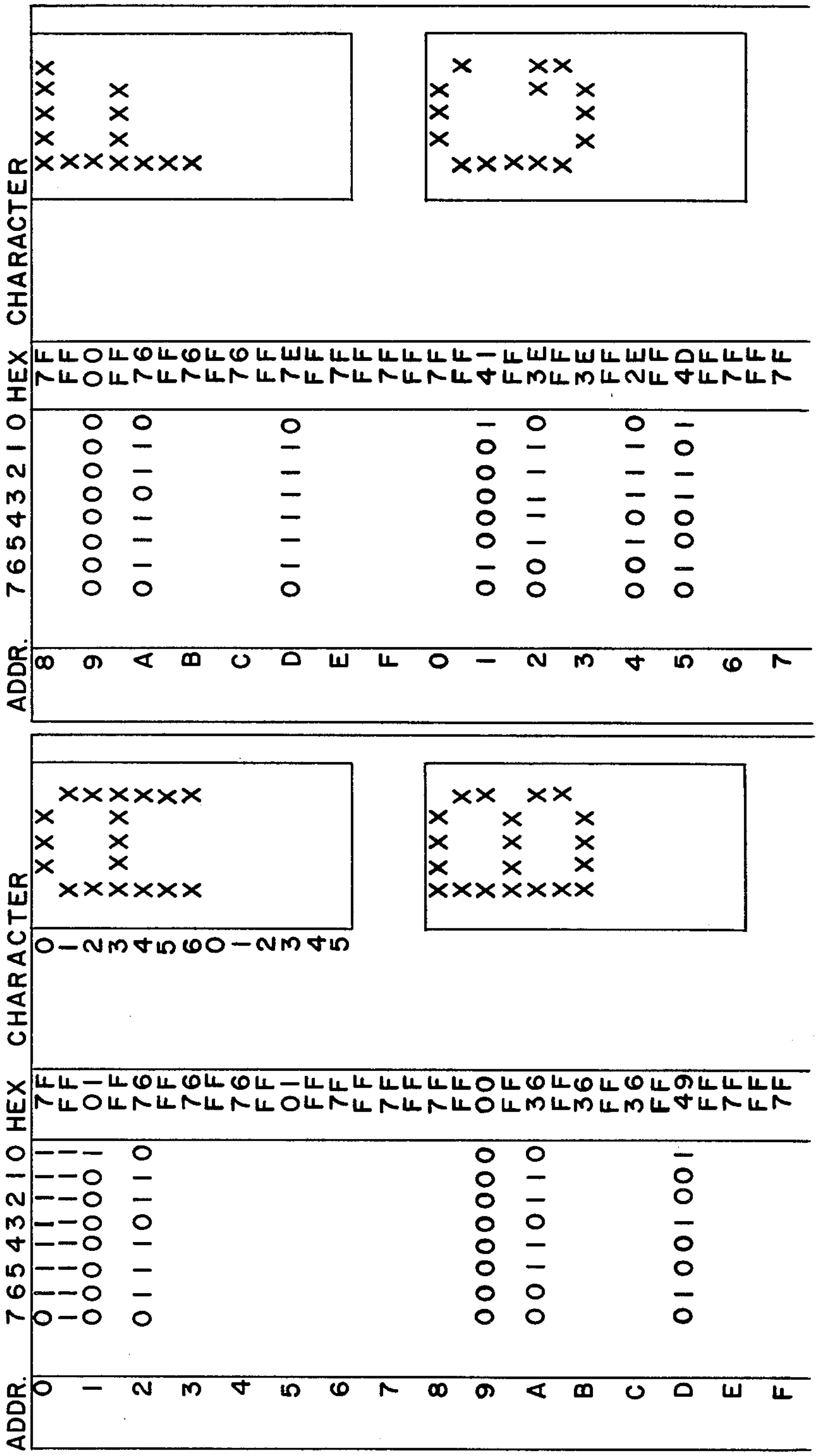
FIG. 10 is an illustration of the ROM organization for printing four characters in a 7×5 matrix font with the thermal printing system of the present invention.

The record to be printed on the ticket has previously been put in the proper format and stored in the RAM 144. The format is controlled by an eight bit code sent by the control microprocessor. Examples of codes for 7×5, 9×5 and 9×9 character formats have previously been given. The least significant six bits in the character code are ASC II while the most significant two bits describe the font that the character is to be printed in. The three 64 character fonts are stored in ROMs 148 and 150 (FIG. 9). FIG. 10 illustrates the ROM organization for the characters A, B, F and G in the 7×5 font.

The START PRINT command causes the printer microprocessor to address the RAM 144 for outputting the first character of the first line to be printed. Concurrently, the printer microprocessor also outputs the code that identifies the first column in the character matrix. These two addresses are input to the ROMs 148 and 150 which in turn output the pattern code for the first column of thirteen dots in the first character of the first line.

This information is latched in a LATCH 152 by a clock signal from a multiplexer 154. As hereafter described, 64 of the individual print elements of the print head are utilized in printing the ticket. These are divided into four groups of thirteen elements each and one group of twelve elements. Each of these groups is utilized to print one of five lines of alphanumeric information on the ticket. As previously explained, alphanumeric information is printed columnwise on the ticket as it travels in a direction which is perpendicular to the row of print elements. Each individual character in a given line is also made up of several columns of dots as indicated in FIG. 10.

By way of example, if the character "A" is to be printed in 7×5 font, the first column of thirteen dots has no dots printed.

Next the microprocessor outputs the address for the first character of the second line of the ticket leaving the column code the same. The output from the ROMs 148 and 150 is now latched in a latch 156 with the first column of the first character of the second line. This process is repeated for lines 3, 4 and 5 of the ticket, the information being latched into latches 158, 160 and 162 respectively. All five latches now contain the information for the printing of the dots for the first column of the first letter of each of the five lines of the ticket.

Next the printer microprocessor causes the multiplexer 154 to strobe the five separate groups 164–168 of print element drivers by sending a strobe signal along a lead 170. This causes the first column of dots of the first letters of each of the five lines to be printed onto the ticket utilizing the contents of the latches 152, 156, 158, 160 and 162. The printer microprocessor then addresses the RAM 154 for outputting the addresses for the second column of the first character of each line, again sequentially loading the latches 152, 156, 158, 160 and 152. The printer microprocessor then causes the multiplexer to again strobe the drivers 164–168 to complete the printing of the entire second column of dots for the first character in each of the five lines of alphanumeric information. This process of loading latches and printing columns repeats for 280 cycles (40 character lines times 7 columns for each character) completing the entire ticket printing. It will be understood that during this process the ticket is being advanced rapidly through the thermal printer module at a speed of, for example, three inches per second.

As previously mentioned, in the thermal printing system of the present invention, printing speed is maximized by electronically controlling the temperature of the print elements in accordance with the varying dot pattern being printed. Each of the groups of print element drivers is tied in parallel to the line 170 and resistor/capacitor delay circuits 172–175 stagger the application of the strobe signal to each of the groups of print element drivers. This spreads the load on the power supply and minimizes the likelihood of overloading the same which would otherwise occur if a large surge of current were instantaneously drawn through a large number of the print elements all at once. The delay caused by the circuits 172–175 is very small and has no effect on the ability of the system to simultaneously print successive columns of dots on the ticket as the ticket moves through the printer module.

Figure 13:
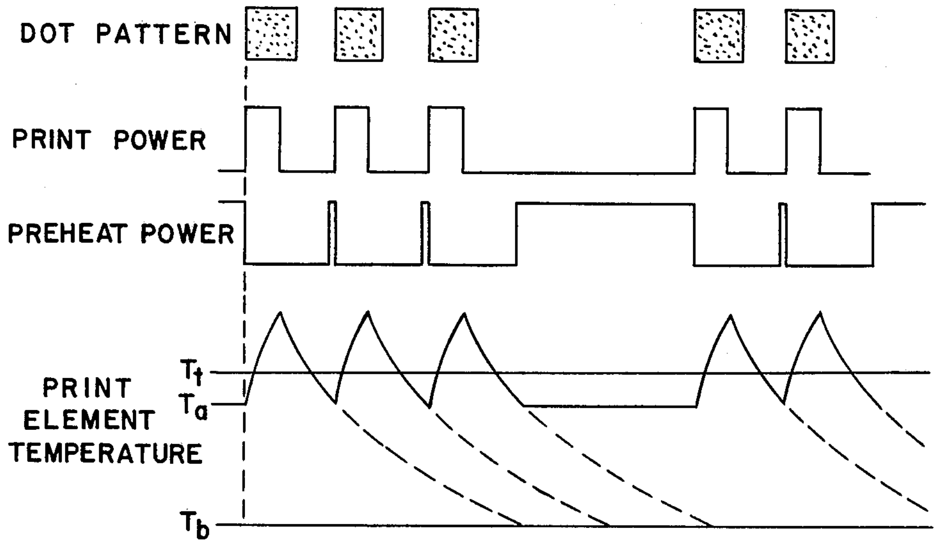
FIG. 13 illustrates the manner in which the printer circuit of FIG. 9 controls the power supplied to the print elements in accordance with the varying dot pattern being printed.

Referring to FIG. 13, once all the column information has been latched into the latches 152, 156, 158, 160 and 162 for a given column of a given character in each of the five lines to be printed, the leading edge of the strobe signal from the multiplexer 154 turns off the preheat power to each of the print elements that are to print a dot. It will be understood that normally during the printing operation preheat power is continuously supplied to each of the print elements in order to maintain their temperature just below the thermal coating threshold temperature. The period of the strobe signal is typically very short, for example three milliseconds. The leading edge of the strobe signal also causes print power to be supplied to each of the print elements that are to print a dot. As to those print elements which do not print a dot during the printing of this column, they continue to have preheat power supplied to them.

As illustrated in FIG. 13, the print power supplied to each of the print elements which are heated during the printing of this column stays on for a short duration, for example 1.5 milliseconds. The print power is of sufficient magnitude to cause each of the print elements which have been selected to heat up to a temperature above the thermal coating threshold temperature so that each of these elements causes a dot to be printed. The dots are printed in pre-selected positions in the column in accordance with the dot matrix pattern of the various letters being printed in the various lines. The preheat power may be roughly one-third of the print power. For example, when a given print element is being supplied with preheat power, thirty milliamps may be caused to flow through it. When a given print element is being supplied with print power, one-hundred milliamps may be caused to flow through it. By way of further example, where the thermal coating threshold temperature is approximately 90° C., the preheat temperature of the elements may be approximately 80° C. and the print element temperature may be approximately 150° C.

FIG. 13 illustrates the power supplied to an individual print element during the printing of seven columns of dots on the ticket. In this example, the print element is heated to cause dots to be printed in columns 1, 2, 3, 6 and 7 of the ticket. The same element does not print a dot in columns 4 and 5 of the ticket. Just prior to the printing of the first dot by this particular print element, the print element has been receiving preheat power so that its temperature is $T_a$. The leading edge of the first strobe signal simultaneously turns off the preheat power and turns on the print power causing the first dot to be printed. The print power stays on for a fraction of the time that the preheat power is off. For example, where the strobe signal is approximately three milliseconds in duration, the print power may stay on for approximately 1.5 milliseconds. Thus for approximately 1.5 milliseconds the element is supplied with no power at all so that it can rapidly cool.

Continuing with FIG. 13, the trailing edge of the first strobe signal immediately causes the preheat power to be once again applied to the print element. However, as this particular print element is to print a dot in the next column, the preheat power is almost instantaneously switched off again and the print power is turned on again. This cycle is repeated three times. After the printing of the third dot, the preheat power stays on for this particular print element throughout the printing of the fourth and fifth columns of dots since this particular print element does not print a dot in either of these columns.

Continuing with FIG. 13, the leading edge of the strobe signal for the sixth column once again turns off the preheat power to this particular print element and turns on the print power. The print power stays on for a fraction of the duration that the preheat power is off causing a dot to be printed by this element in the sixth column. The trailing edge of the strobe signal for the sixth column causes the preheat power to once again momentarily turn on to this element. The leading edge of the following strobe signal for the seventh column causes the preheat power to turn off and the print power to turn on once again so that the dot in the seventh column can be printed by this element.

The wave forms depicted in FIG. 13 beneath the preheat power wave forms illustrate the manner in which the print element rapidly fluctuates above and below the thermal coating threshold temperature $T_t$ during the printing of dots shown. By turning off all current to the element after the printing of each dot, cooling time is minimized. Heating time is minimized by by turning on preheat power prior to printing each dot. Thus, each print element can rapidly print a pattern of dots in a row. The temperature of the print element is prevented from cooling down to the heat sink temperature $T_b$. The heat sink temperature is the temperature of the large metal head dissipating portion 75 (FIG. 8) of the print head 44.

Figure 11:
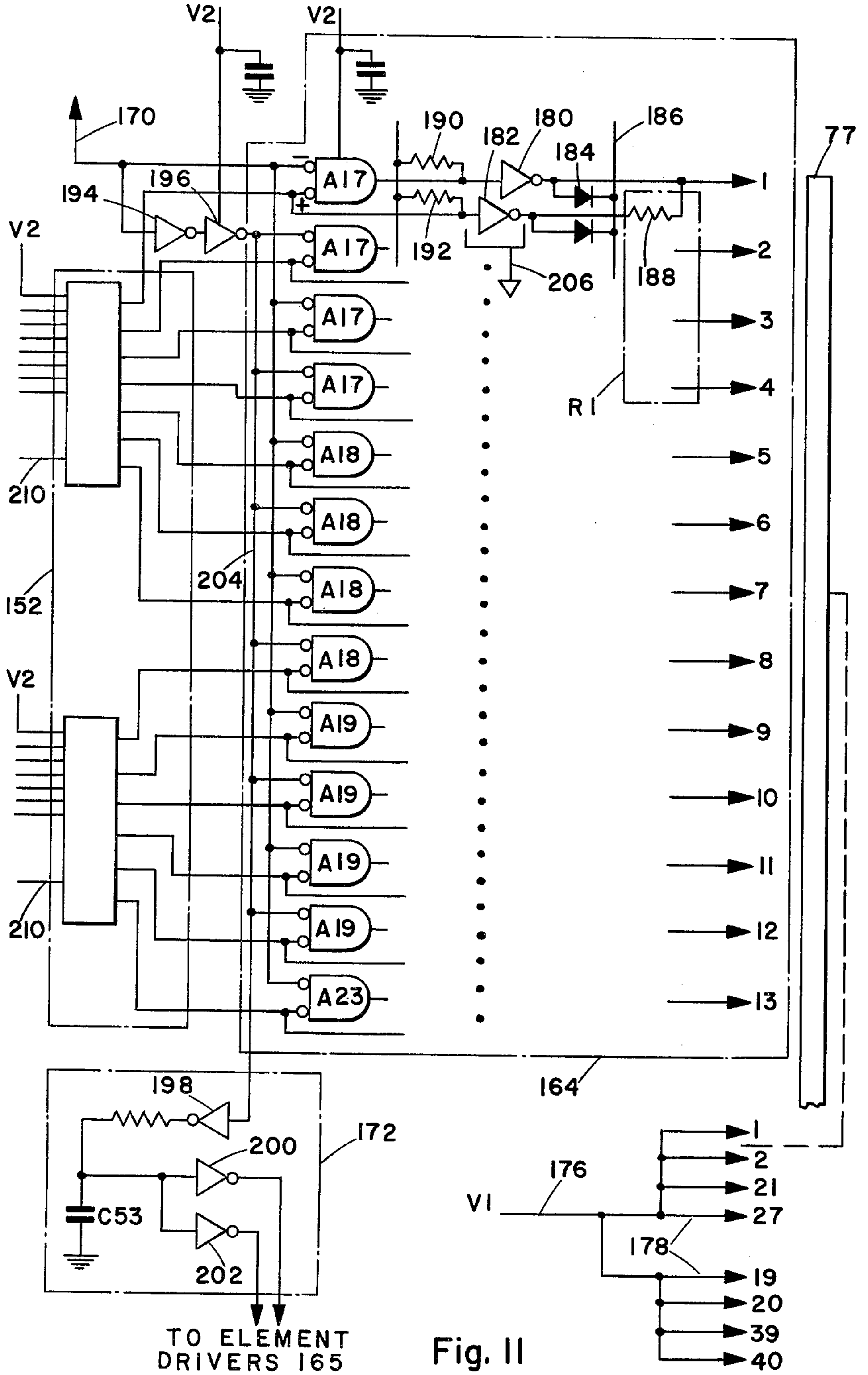
FIG. 11 is a schematic diagram illustrating one group of the combination preheat and print drivers of the circuit depicted in FIG. 9.

In order to further explain the circuit of FIG. 9, the latch 152 and the group 164 of print element drivers have been illustrated in schematic form in FIG. 11. As shown therein, a power supply voltage V1, for example +35 volts, on a lead 176 is connected to 64 of the conductors 76 (FIG. 7) on one side of the print head through conductor branches 178 (FIG. 11). In FIG. 11, the conductors on the right side of the drawing represented by the arrow heads marked with numerals 1–13 are connected to individual ones of the conductors 76 on the otherside of the print head (FIG. 7). This allows current to be selectively applied to the first thirteen ones of the print elements 78. These elements are delineated by the dividing of the resistive bar 77 into segments by the conductors 76.

The latch for the first thirteen print elements is surrounded by phantom lines in FIG. 11 and marked with the referenced numeral 152. In the preferred embodiment of the circuit, the latch 152 may consist of two chips which are type SN54LS273. The element drivers for the first thirteen print elements are surrounded by phantom lines marked with the references numeral 164 in FIG. 11. Each of the print elements has connected thereto on one side a combination preheat and print driver including a NEGATIVE AND gate such as A17 having its output controlling a print driver 180 and having one input tied to the control terminal of a preheat driver 182. The drivers 180 and 182 may be provided by utilizing multiple chips of the type ULN2803A. Each of the diodes 184 in these driver chips are not utilized. This is shown in FIG. 11 by the fact that each of the diodes is connected in parallel to a common lead such as 186 whose other end is not connected to any conductor. The outputs of the drivers 180 and 182 are both connected to the conductor leading to their corresponding print element. The output of the preheat driver 182 is connected through a resistor 188 having a suitable resistance so that when the driver 182 is on and the driver 180 is off, the preheat power supplied to the print element is sufficient to maintain its temperature just below the thermal coating threshold temperature. The Voltage V1 is chosen so that the amount of power supplied to the print element when the print driver 180 is on is sufficient to raise the temperature of the print element above the thermal coating threshold temperature. The resistor 188 may be one of a package R1 of four resistors.

The inputs to each of the drivers 180 and 182 have a supplemental input voltage V2, which may be +5 volts, connected thereto through respective resistors 190 and 192. This provides the proper interface between the logic signals and the drivers 180 and 182 required to turn the drivers on and off in response to the applied logic signal. The gate A17 is actually a NOR gate connected to operate as a NEGATIVE AND gate. It may be provided by utilizing one gate of a chip of the type SN54LS02, there being four such gates in one of these chips.

In operation, once the information for a particular column of a particular character in each line has been stored into the latches, including the latch 152, the multiplexer 154 transmits a strobe signal along the lead 170 to each of the gates A17, A18, A19 and A23. A pair of inverters 194 and 196 connected in series are connected between the lead 170 and the negative inputs of half of the gates A17, A18, A19 and A23. The negative inputs of the other gates are connected directly to the lead 170. This arrangement is utilized to fan out the strobe signal from the multiplexer to the thirteen gates of the group 164 of element drivers. An inverter 198, a resistor R38, a capacitor C53, and inverters 200 and 202 make up the delay circuit 172 (FIG. 9) and transmit the strobe signal from the lead 204 to the next group 165 of element drivers. The output of each of the drivers 180 and 184 is tied to a common lead 206 which is coupled to ground through a resistor 208 (FIG. 9) having a low resistance such as 0.2 ohms.

Prior to the initiation of the strobe signal, the signal supplied to the positive input of each of the gates A17, A18, A19 and A23 is HI and the input to each of the negative terminals of the gates is LOW. Under these conditions, each of the drivers 182 is turned on so that each of the print elements is supplied with preheat power. Since the negative and positive inputs of each of the gates A17, A18, A19 and A23 are LO and HI, respectively, the output of each of the gates is LO and the print drivers 180 are off.

When the multiplexer sends a strobe signal, it is transmitted via the lead 170 to the negative inputs of each of the gates A17, A18, A19 and A23 and via leads 210 to the chips which comprise the latch 152. The leading edge of this strobe signal causes the positive inputs of each of the gates A17, A18, A19 and A23 corresponding to the elements which are to print to be set LO. The other ones of the negative inputs of the gates remain HI so these elements continue to draw preheat power. The leading edge of the strobe signal also causes the negative inputs of each of the gates A17, A18, A19 and A23 which correspond to the elements which are to print to be set LO. Each of the gates which now have their inputs LO now output a HI signal to their print drivers 180 causing print power to be drawn through each one of their corresponding print elements so that a dot is immediately printed. It will be noted that for each of these gates having both of their inputs set LO, the preheat drivers 182 are off so that no preheat power is drawn by them.

Midway through the strobe signal, the print power is turned off and the elements which just printed dots rapidly cool since they receive no power until the end of the strobe signal. The trailing edge of the strobe signal causes the latch 152 to set the positive inputs of the gates A17, A18, A19 and A23 corresponding to the elements which have just printed dots HI again. Thus, all of the print elements corresponding to the group 164 of drivers are now drawing a preheat current and are ready to print the next line of dots.

When all of the alphanumeric information has been printed on the ticket, a diagnostic routine is performed to test the continuity of each of the print elements. This is accomplished by applying print power to each of the print drivers 180 (FIG. 11) one at a time in succession and by monitoring the current flow through each of the print elements. The current which flows through each print element develops a voltage across the resistor 208 (FIG. 9) which is sensed by the comparator 140 to provide an indication of the amplitude of the current flowing through the print element.

Figure 12:
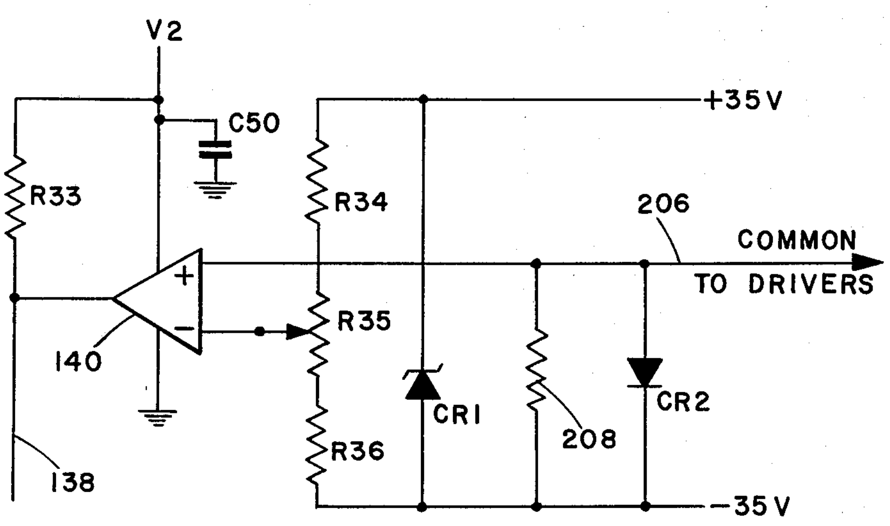
FIG. 12 is a schematic diagram of the current sensing portion of the circuit of FIG. 9 which is utilized to carry out the print head diagnostic operation.

A schematic diagram of the portion of the circuit of FIG. 9 which is utilized in performing the diagnostic routine is shown in FIG. 12. A normal element will allow enough current flow through the resistor 208 to develop a voltage across the same which is more positive at the non-inverting terminal than a pre-set threshold at the inverting terminal of the comparator 140. This causes the comparator to send a HI output along the lead 138 to the printer microprocessor 128 indicating a normal element. An open or damaged print element will have a higher than normal resistance and the current flowing through the resistor 208 will be less than the amount required to cross the threshold of the comparator. The comparator will then send a LO output along the lead 138 to the printer microprocessor indicating a faulty element. During the printing of the ticket, a diode CR2 (FIG. 12) shunts the sensing resistor 208 keeping the common driver emitter lead 206 from developing more than a predetermined voltage, for example 0.9 volts. A zener diode CR1 (FIG. 12) establishes the reference voltage from which the threshold of the comparator 140 is derived.

If the printer microprocessor detects a faulty print element during the diagnostic routine, it sends a signal to the control microprocessor which in turn sends a signal to a station computer or other receiver indicating that maintenance is required. In the event that a defective print element is detected, the printer microprocessor prevents further ticket printing from taking place until the print element is repaired.

Finally, a programmable timer 210 (FIG. 9) monitors the strobe signals transmitted from the multiplexer 154. If no strobe signals are detected after a predetermined time interval, the programmable timer 210 operates a power switch 212 to turn off the power supply voltage V1 to the print elements. Under this condition the print elements no longer draw preheat power. The programmable timer 210 is preferably set to turn off the power supply to the print elements after an interval of time which is sufficiently long to indicate that the printing of a single ticket is complete. Thus, standby power consumption of the printer circuit is minimized. This turn off is further required since the print head cannot withstand continuous application of power for more than a few seconds because the print elements will burn up. When a purchaser next operates the vending machine 10 (FIG. 1) to purchase a ticket, the printer microprocessor turns on the power supply to the print head far enough in advance, for example 300 milliseconds, to preheat the elements before the printing operation commences. Preheat power is supplied to each of the 64 print elements for a time sufficient to bring them to the temperature $T_a$ just below the thermal coating threshold temperature. Thus, moments later when the first column of dots is printed, the elements are already preheated so that the rapid printing operation can take place as previously described.

Having described a preferred embodiment of the thermal printing system of the present invention, it will be apparent to those skilled in the art that the system may be modified in arrangement and detail. Therefore, the protection afforded our invention should be limited only in accordance with the scope of the following claims:

We claim:

1. A thermal printing system for rapidly printing alphanumeric information in dot matrix format consisting of a plurality of columns of dots on stock coated with material having a predetermined threshold temperature at which it changes color, comprising;

a print head including a plurality of print elements arranged in a row, each print element adapted to be selectively heated in an amount proportional to the amplitude of an electric current made to flow therethrough;

means for supporting and propelling the stock past the print head adjacent to the print elements and in a direction extending generally perpendicular to the row of print elements;

control means for receiving commands representative of the format and the text of the alphanumeric information to be printed and for decoding the commands and storing data representative of the columns of dots to be printed; and driver means responsive to the control means for causing each column of dots to be printed by sequentially causing a preheat current, a print current and zero current to flow through a first portion of the print elements and the preheat current to continuously flow through a second remaining portion of the print elements, the amplitudes of the preheat current and the print current being sufficient so that the temperature of the print elements of the first portion rapidly fluctuates above and below the threshold temperature whereby the columns of dots can be printed in rapid succession.

2. A thermal printing according to claim 1 which further comprises means for testing each print element after the alphanumeric information has been printed on the stock to determine if any of the elements are defective including:

means for sequentially passing a predetermined current through each of the print elements;

a current sensing resistor connected to the print elements; and means for comparing each voltage across the current sensing resistor to a predetermined reference voltage and for generating a signal indicating whether the corresponding print element is faulty.

3. A thermal printing according to claim 1 which further comprises timer means for eliminating the flow of current through each of the print elements upon the expiration of a predetermined time interval following the completion of the printing of the alphanumeric information on the stock.

4. A thermal printing system according to claim 1 wherein the driver means includes a preheat driver and a print driver for each of the print elements.

5. A thermal printing system according to claim 4 wherein the print drivers and preheat drivers are divided into a plurality of groups each adapted to receive a strobe signal from the control means, the system further comprising a resistor/capacitor network connected between each group of print drivers for staggering the application of the strobe signal to the groups of drivers.

6. A thermal printing system according to claim 1 wherein the means for supporting and propelling the stock past the print head includes:

a pair of ticket guide plates defining a longitudinally extending channel therebetween, each guide plate having an aperture in its medial portion;

a drive roller;

means for rotatably mounting the driver roller so that its outer periphery extends through the aperture in one of the guide plates into the channel;

means for mounting the print head in the aperture in the other guide plate for pivotal movement toward and away from the drive roller;

means for resiliently biasing the print head toward the drive roller;

adjustable means for limiting the movement of the print head toward the drive roller; and means located at the forward and rearward ends of the guide plates for permitting the stock to be propelled between the channel and adjacent stock processing modules without jamming.

7. A thermal printing system according to claim 1 wherein the control means includes:

a microprocessor;

a random access memory operatively coupled to the microprocessor;

a plurality of read only memories operatively coupled to the microprocessor for storing the decoded data representative of the dot columns of the dot matrix format of the alphanumeric information;

a multiplexer operatively coupled to the microprocessor; and a plurality of latches interfaced between the read only memories and the driver means for operating the driver means in response to signals sent from the microprocessor through the multiplexer.

* * * * *